(12) United States Patent
O'Connor et al.

(10) Patent No.: US 12,131,229 B2
(45) Date of Patent: Oct. 29, 2024

(54) PREDICTIVE DATA ANALYSIS TECHNIQUES USING BIDIRECTIONAL ENCODINGS OF STRUCTURED DATA FIELDS

(71) Applicant: Optum Services (Ireland) Limited, Dublin (IE)

(72) Inventors: Louise O'Connor, Dublin (IE); Giorgio Mondauto, Dublin (IE); David Walsh, Ballina (IE); Rachel Costello, Portlaoise (IE); Darragh Hanley, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 772 days.

(21) Appl. No.: 16/915,135

(22) Filed: Jun. 29, 2020

(65) Prior Publication Data
US 2021/0406739 A1 Dec. 30, 2021

(51) Int. Cl.
*G06N 3/08* (2023.01)
*G06N 20/00* (2019.01)
*G06N 5/045* (2023.01)

(52) U.S. Cl.
CPC ............ *G06N 20/00* (2019.01); *G06N 3/08* (2013.01); *G06N 5/045* (2013.01)

(58) Field of Classification Search
None
See application file for complete search history.

(56) References Cited

U.S. PATENT DOCUMENTS

| 7,689,520 | B2 | 3/2010 | Burges et al. |
| 10,628,834 | B1* | 4/2020 | Agarwal ............... G16H 10/60 |
| 2017/0352105 | A1 | 12/2017 | Billings |
| 2019/0005410 | A1 | 1/2019 | Shekhar et al. |

OTHER PUBLICATIONS

Yin P, Neubig G, Yih WT, Riedel S. TaBERT: Pretraining for joint understanding of textual and tabular data. arXiv preprint arXiv: 2005.08314. May 17, 2020. (Year: 2020).*
Popowich F. Using text mining and natural language processing for health care claims processing. ACM SIGKDD Explorations Newsletter. Jun. 1, 2005;7(1):59-66. (Year: 2005).*

(Continued)

*Primary Examiner* — Vincent Gonzales
(74) *Attorney, Agent, or Firm* — Alston & Bird LLP

(57) ABSTRACT

There is a need for more effective and efficient predictive data analysis based at least in part on structured data. This need can be addressed by, for example, solutions for performing predictive data analysis using bidirectional encoder deep learning models that are configured to process structured data attributes. In one example, a method includes identifying a group of training structured data fields; generating a group of per-field tokenized values for each training structured data field; generating a bidirectional encoder deep learning model based at least in part on each group of per-field tokenized values for a training structured data field; and performing one or more prediction-based actions based at least in part on the trained bidirectional encoder deep learning model.

20 Claims, 13 Drawing Sheets

(56) References Cited

OTHER PUBLICATIONS

McCarley JS, Chakravarti R, Sil A. Structured pruning of a bert-based question answering model. arXiv preprint arXiv:1910.06360. Oct. 14, 2019. (Year: 2019).*
Wu, Yonghui, Mike Schuster, Zhifeng Chen, Quoc V. Le, Mohammad Norouzi, Wolfgang Macherey, Maxim Krikun et al. "Google's neural machine translation system: Bridging the gap between human and machine translation." arXiv preprint arXiv:1609.08144 ( 2016).) (Year: 2016).*
Alammar, Jay. "A Visual Guide To Using BERT For The First Time," GitHub, (14 pages). [Article, Online]. [Retrieved from the Internet Sep. 29, 2020]<URL: http://jalammar.github.io/a-visual-guide-to-using-bert-for-the-first-time/>.
Devlin, Jacob et al. "BERT: Pre-Training Of Deep Bidirectional Transformers For Language Understanding," arXiv preprint arXiv:1810.04805v2, May 24, 2019, (16 pages).
Habibi, Maryam et al. "Deep Learning With Word Embeddings Improves Biomedical Named Entity Recognition," Bioinformatics, vol. 33, (2017), pp. i37-i48. DOI: 10.1093/bioinformatics/btx228.
Kana, Michel. "BERT For Dummies—Step By Step Tutorial." Towards Data Science, Sep. 14, 2019, (14 pages). [Article, Online]. [Retrieved from the Internet Sep. 29, 2020]<https://towardsdatascience.com/bert-for-dummies-step-by-step-tutorial-fb90890ffe03>.
Nickel, Maximilian et al. "Poincare Embeddings For Learning Hierarchical Representations," In Advances In Neural Information Processing Systems, (2017), (10 pages).
Rajapakse, Thilina. "A Simple Guide On Using BERT For Binary Text Classification." The Startup, Jun. 9, 2019, (11 pages). [Article, Online]. [Retrieved from the Internet Sep. 29, 2020]<URL: https://medium.com/swlh/a-simple-guide-on-using-bert-for-text-classification-bbf041ac8d04>.
Yoon, Wonjin et al. "CollaboNet: Collaboration of Deep Neural Networks For Biomedical Named Entity Recognition," BMC Bioinformatics, vol. 20, (Suppl. 10):249, (2019), pp. 55-65. DOI: https://doi.org/10.1186/s12859-019-2813-6.

* cited by examiner

Claim_1 [ICDCodes – MASK– .. – ... – ... – State– ... – ... – ... – Gender]
Claim_2 [MASK– ProcCode– .. – ... – ... – State– ... – ... – ... – Gender]
. .
. .
Claim_N [ICDCodes – ProcCode– .. – ... – ... – MASK– ... – ... – ... – Gender]

FIG. 8

PREDICTIVE DATA ANALYSIS TECHNIQUES USING BIDIRECTIONAL ENCODINGS OF STRUCTURED DATA FIELDS

BACKGROUND

Various embodiments of the present invention address technical challenges related to performing predictive data analysis using structured data. Various embodiments of the present invention address the shortcomings of existing predictive data analysis systems and disclose various techniques for efficiently and reliably performing predictive data analysis using structured data.

BRIEF SUMMARY

In general, embodiments of the present invention provide methods, apparatus, systems, computing devices, computing entities, and/or the like for performing predictive data analysis using structured data. Certain embodiments of the present invention utilize systems, methods, and computer program products that perform predictive data analysis by utilizing at least one of per-field tokenized values for structured data fields, field value tokenized values, field type tokenized values, predictive entity tokenized values, data entry tokenized values, data entry segment tokenized values, masked tokenization representations, and bidirectional encoder deep learning models.

In accordance with one aspect, a method is provided. In one embodiment, the method comprises: identifying a plurality of training structured data fields, wherein each training structured data field of the plurality of training structured data fields is associated with a field value, field type, a predictive entity, a data entry, and a data entry segment within the data entry; for each training structured data field of the plurality of training structured data fields, generating a plurality of per-field tokenized values, wherein the plurality of per-field tokenized values for a training structured data field of the plurality of training structured data fields comprise: a field value tokenized value for the training structured data field that is generated based at least in part on the field value for the training structured data field, a field type tokenized value for the training structured data field that is generated based at least in part on the field type for the training structured data field, a predictive entity tokenized value for the training structured data field that is generated based at least in part on the predictive entity for the training structured data field, a data entry tokenized value for the training structured data field that is generated based at least in part on the data entry for the training structured data field, and a data entry segment tokenized value for the training structured data field that is generated based at least in part on the data entry segment for the structured data field; generating a pretrained bidirectional encoder deep learning model based at least in part on each plurality of per-field tokenized values for a training structured data field of the plurality of training structured data fields; and performing one or more prediction-based actions based at least in part on the pretrained bidirectional encoder deep learning model.

In accordance with another aspect, a computer program product is provided. The computer program product may comprise at least one computer-readable storage medium having computer-readable program code portions stored therein, the computer-readable program code portions comprising executable portions configured to: identify a plurality of training structured data fields, wherein each training structured data field of the plurality of training structured data fields is associated with a field value, field type, a predictive entity, a data entry, and a data entry segment within the data entry; for each training structured data field of the plurality of training structured data fields, generate a plurality of per-field tokenized values, wherein the plurality of per-field tokenized values for a training structured data field of the plurality of training structured data fields comprise: a field value tokenized value for the training structured data field that is generated based at least in part on the field value for the training structured data field, a field type tokenized value for the training structured data field that is generated based at least in part on the field type for the training structured data field, a predictive entity tokenized value for the training structured data field that is generated based at least in part on the predictive entity for the training structured data field, a data entry tokenized value for the training structured data field that is generated based at least in part on the data entry for the training structured data field, and a data entry segment tokenized value for the training structured data field that is generated based at least in part on the data entry segment for the structured data field; generate a pretrained bidirectional encoder deep learning model based at least in part on each plurality of per-field tokenized values for a training structured data field of the plurality of training structured data fields; and perform one or more prediction-based actions based at least in part on the pretrained bidirectional encoder deep learning model.

In accordance with yet another aspect, an apparatus comprising at least one processor and at least one memory including computer program code is provided. In one embodiment, the at least one memory and the computer program code may be configured to, with the processor, cause the apparatus to: identify a plurality of training structured data fields, wherein each training structured data field of the plurality of training structured data fields is associated with a field value, field type, a predictive entity, a data entry, and a data entry segment within the data entry; for each training structured data field of the plurality of training structured data fields, generate a plurality of per-field tokenized values, wherein the plurality of per-field tokenized values for a training structured data field of the plurality of training structured data fields comprise: a field value tokenized value for the training structured data field that is generated based at least in part on the field value for the training structured data field, a field type tokenized value for the training structured data field that is generated based at least in part on the field type for the training structured data field, a predictive entity tokenized value for the training structured data field that is generated based at least in part on the predictive entity for the training structured data field, a data entry tokenized value for the training structured data field that is generated based at least in part on the data entry for the training structured data field, and a data entry segment tokenized value for the training structured data field that is generated based at least in part on the data entry segment for the structured data field; generate a pretrained bidirectional encoder deep learning model based at least in part on each plurality of per-field tokenized values for a training structured data field of the plurality of training structured data fields; and perform one or more prediction-based actions based at least in part on the pretrained bidirectional encoder deep learning model.

BRIEF DESCRIPTION OF THE DRAWINGS

Figure 1:
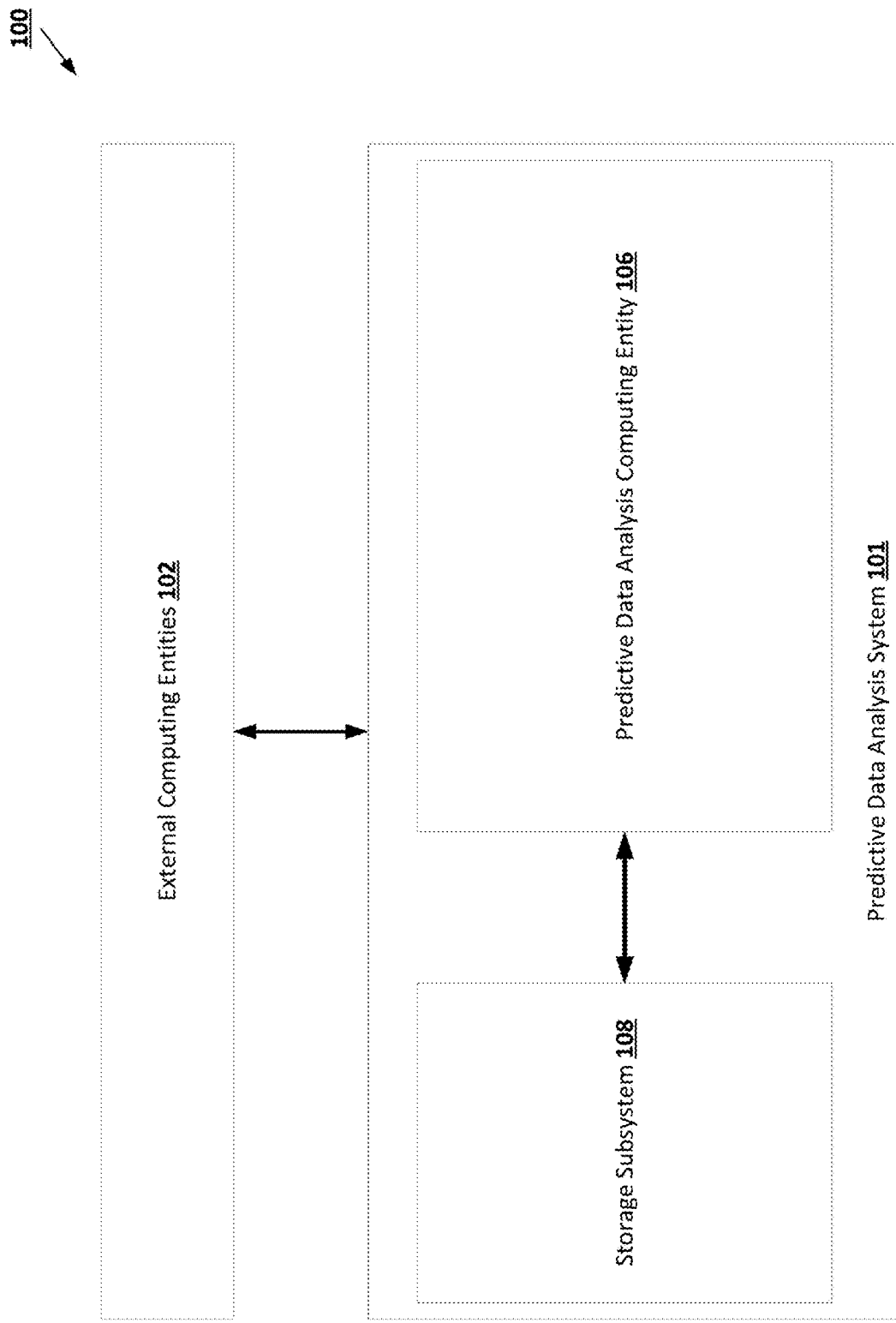

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
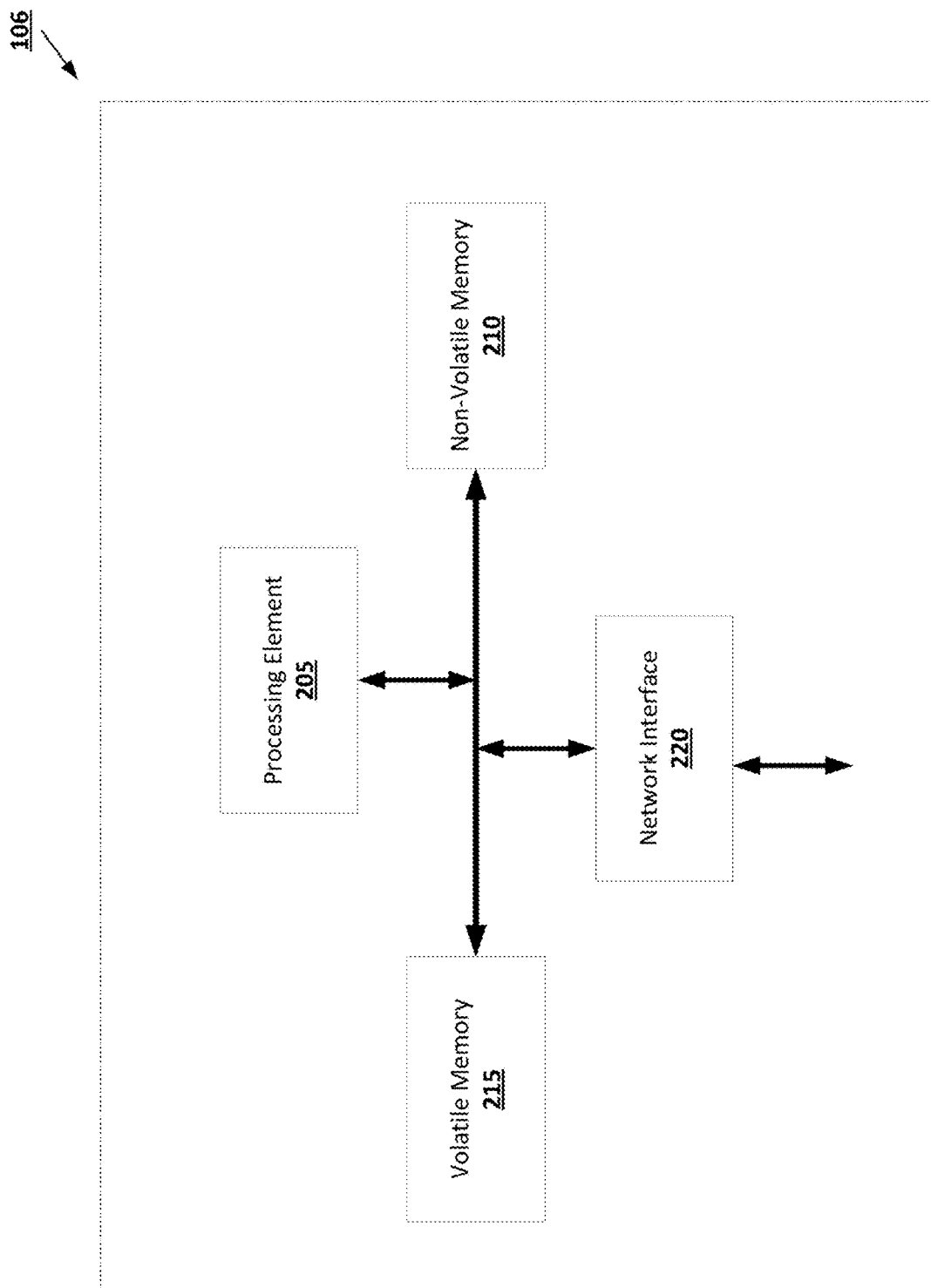

FIG. 2 provides an example predictive data analysis computing entity in accordance with some embodiments discussed herein.

Figure 3:
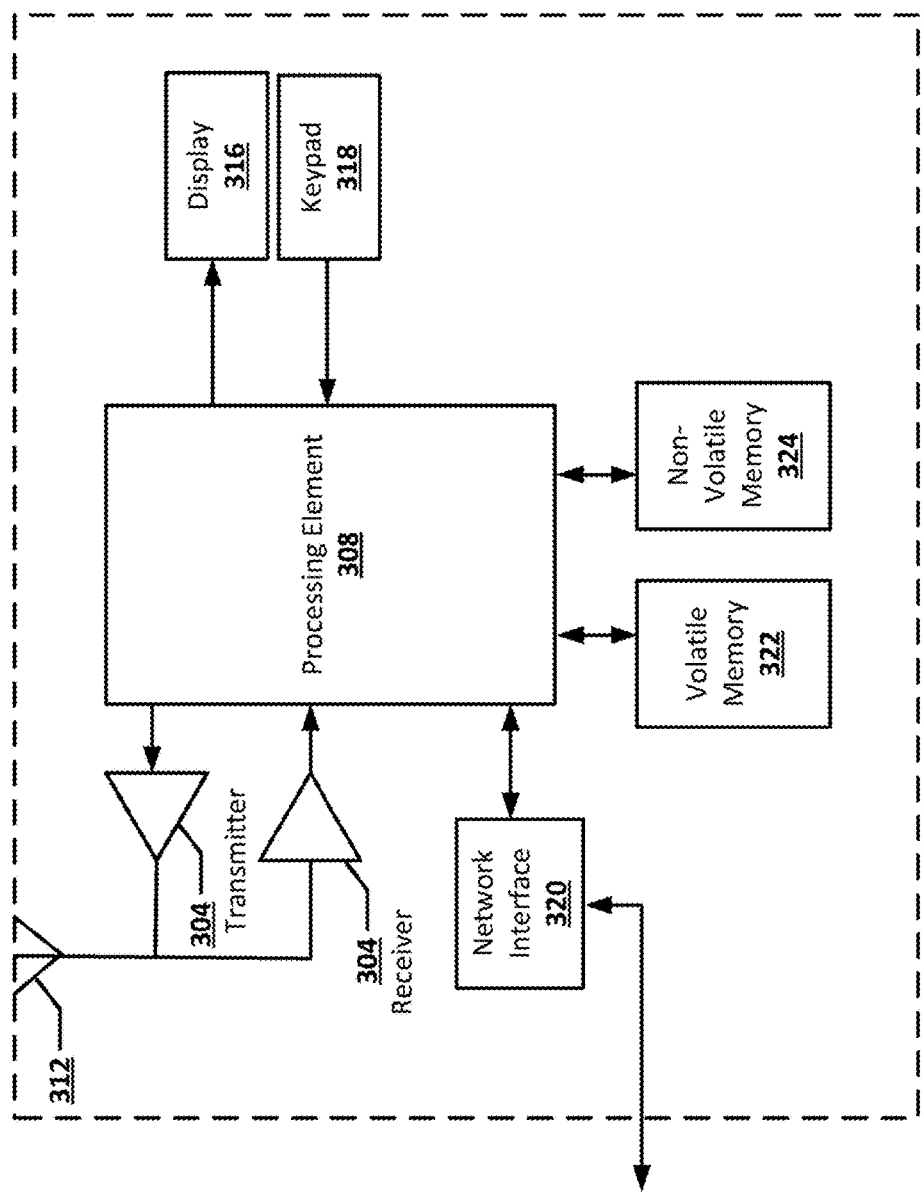

FIG. 3 provides an example external computing entity in accordance with some embodiments discussed herein.

Figure 4:
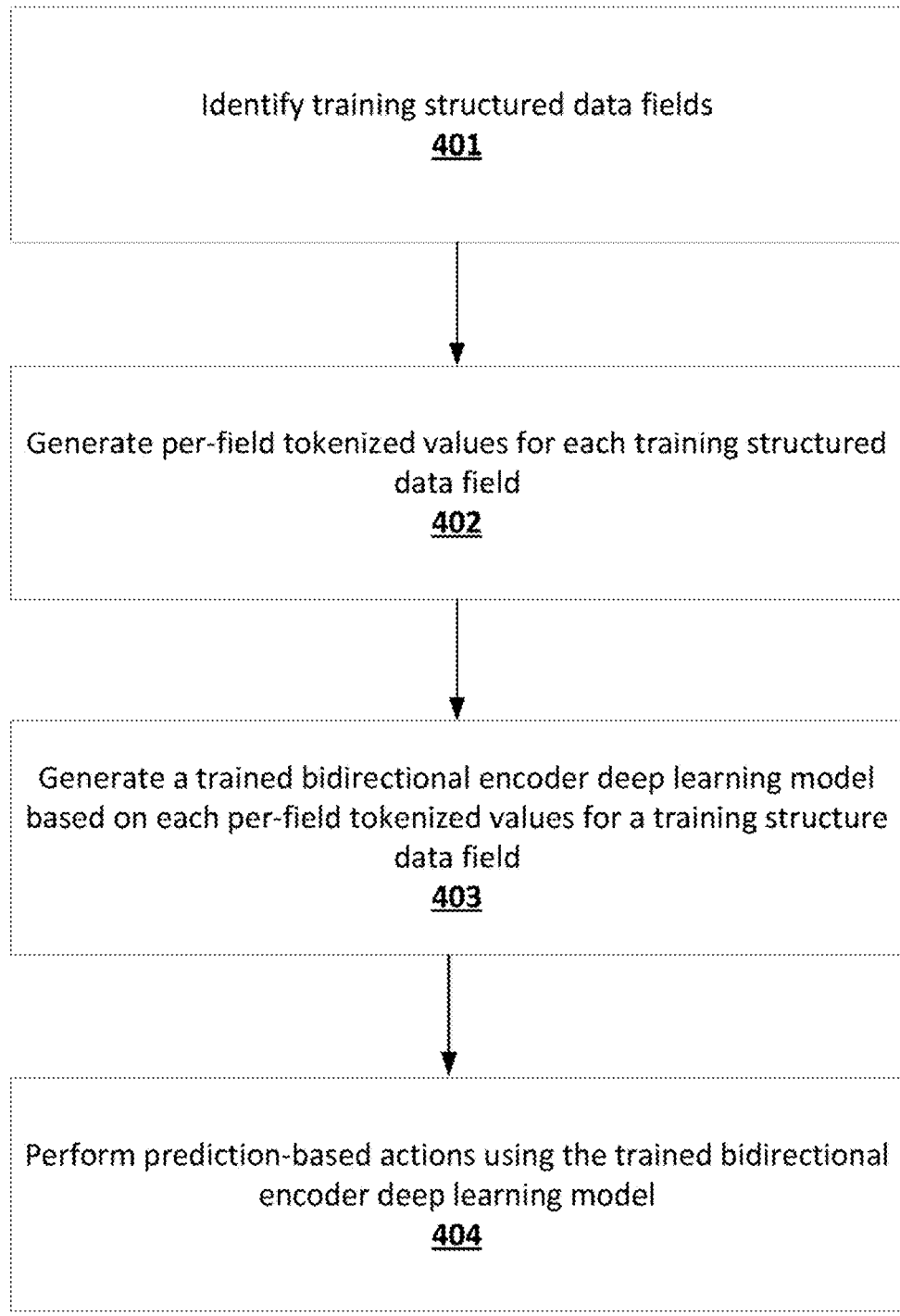

FIG. 4 is a flowchart diagram of an example process for performing predictive data analysis operations based at least in part on structured data fields in accordance with some embodiments discussed herein.

Figure 5:
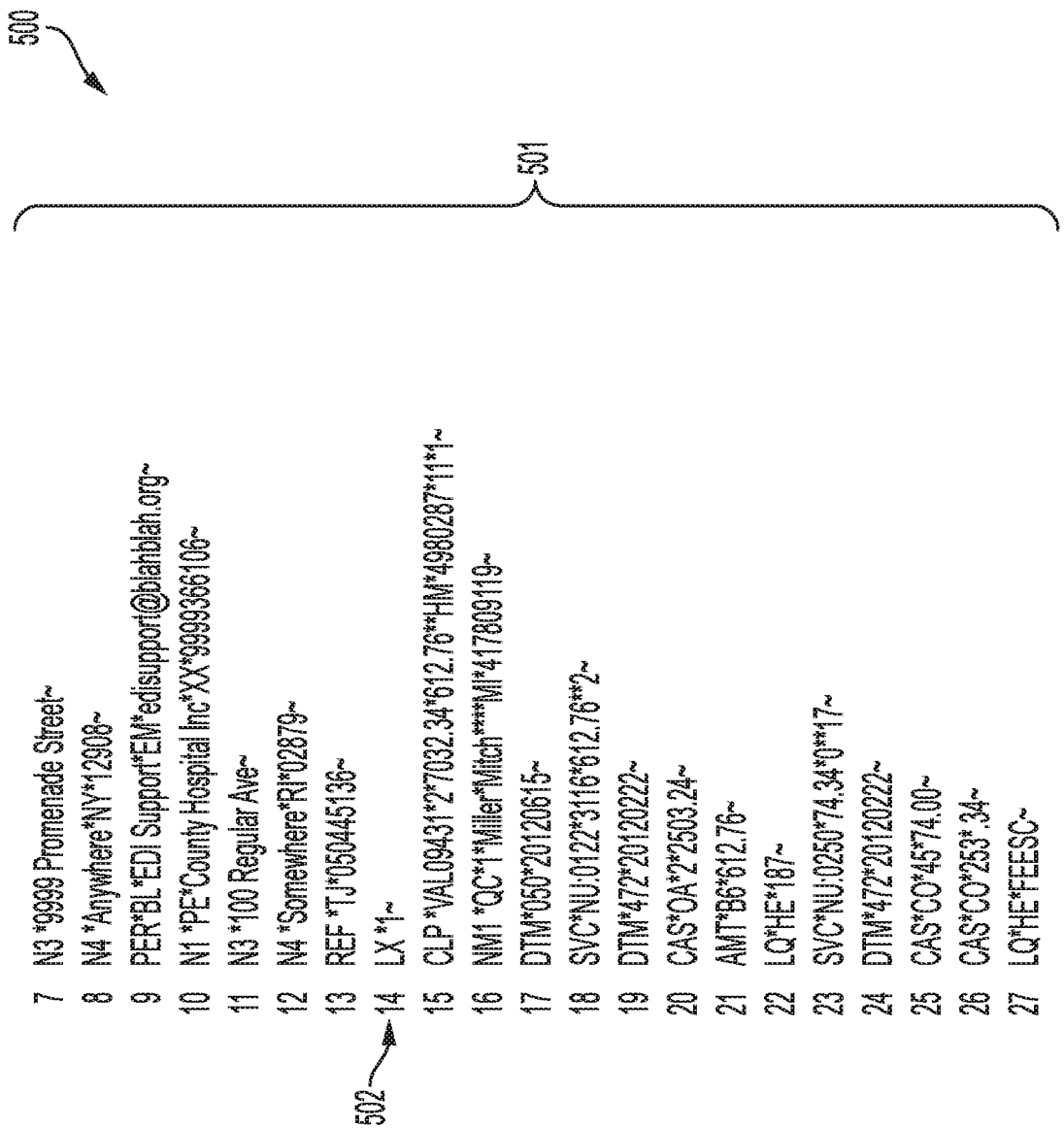

FIG. 5 provides an operational example of a structured data object portion in accordance with some embodiments discussed herein.

Figure 6:
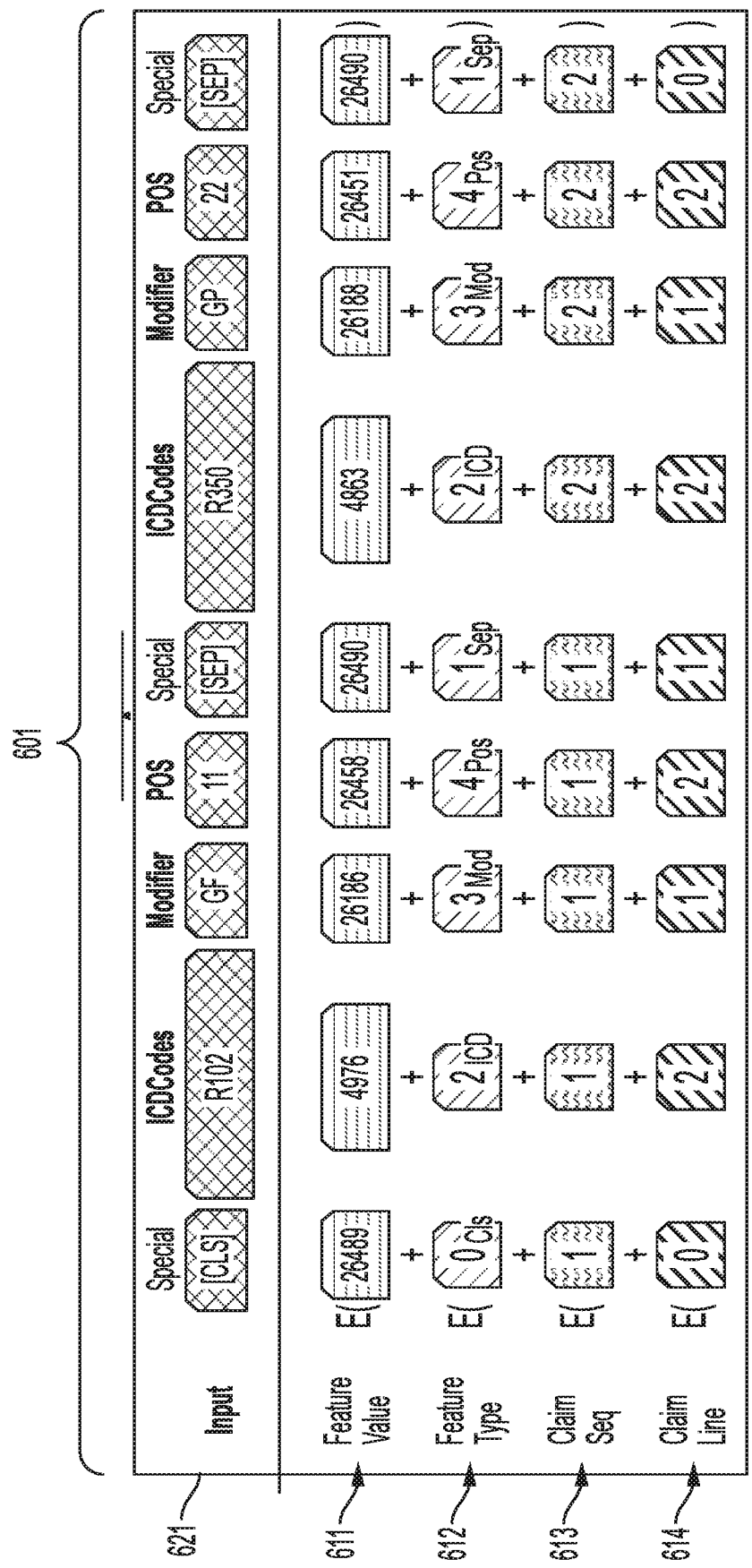

FIG. 6 provides an operational example of nine per-field tokenized values in accordance with some embodiments discussed herein.

Figure 7:
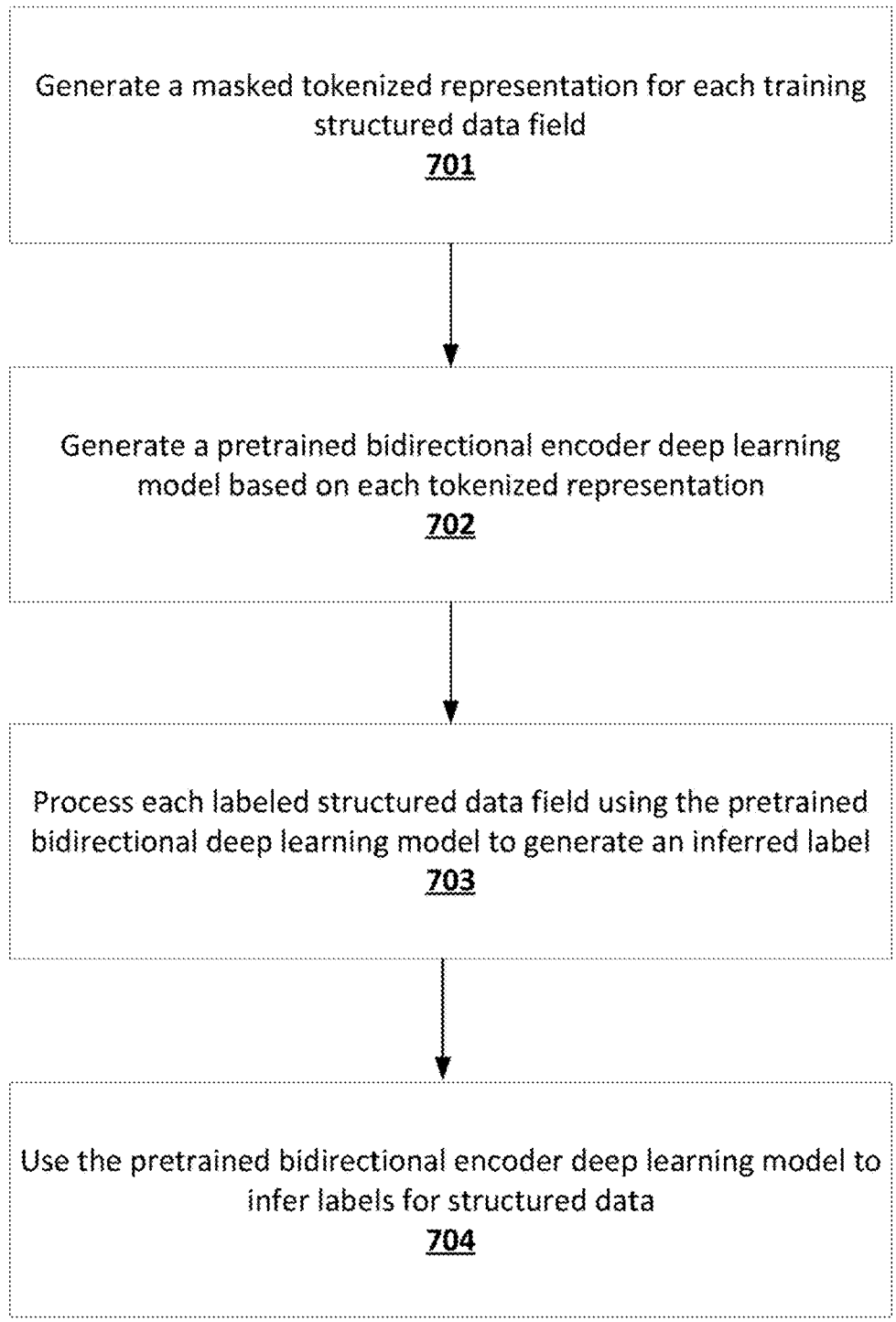

FIG. 7 is a flowchart diagram of an example process for generating a trained bidirectional encoder deep learning model in accordance with some embodiments discussed herein.

FIG. 8 provides an operational example of a group of masked tokenized representations in accordance with some embodiments discussed herein.

Figure 9:
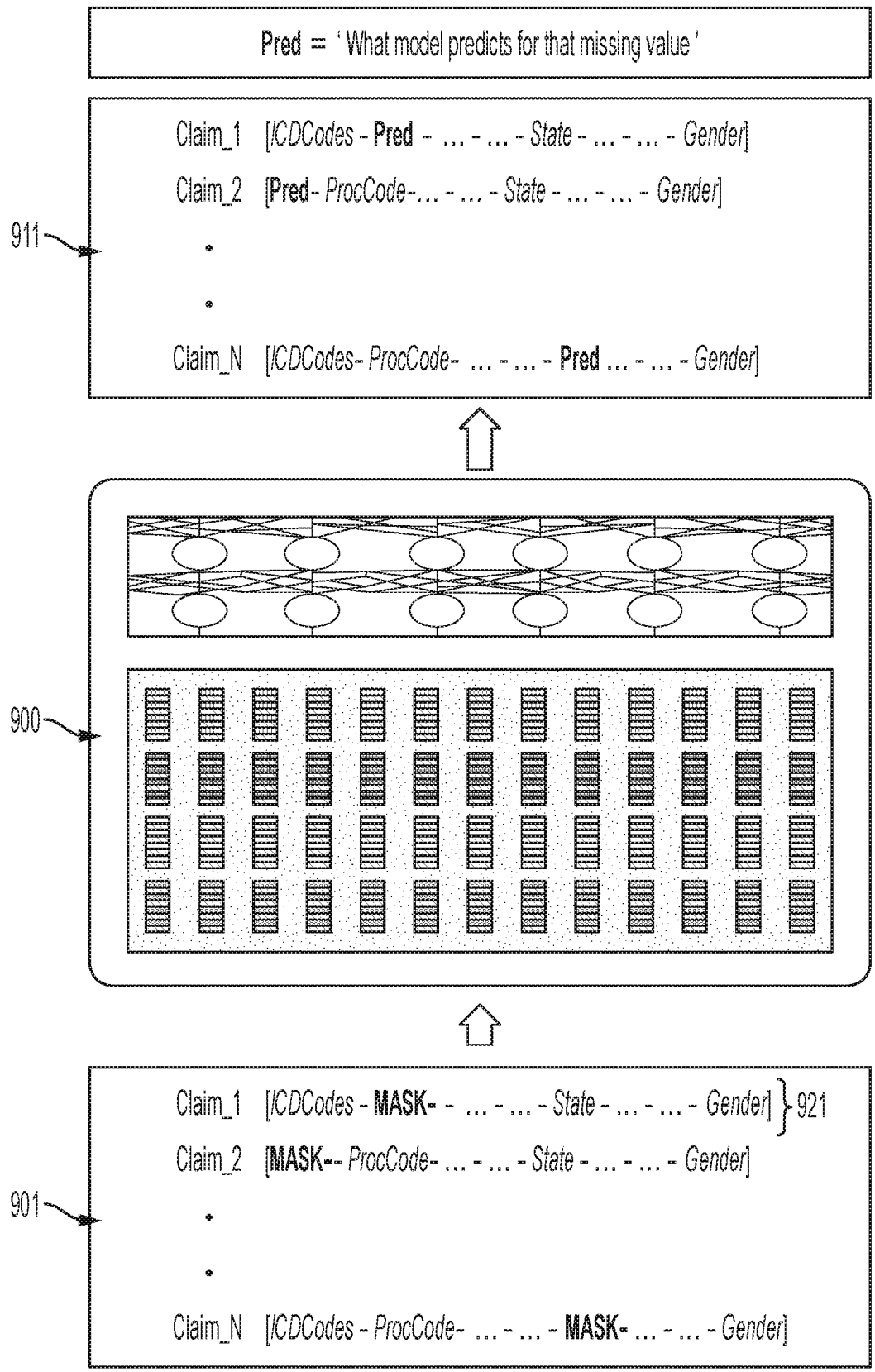

FIG. 9 provides an operational example of generating a pretrained bidirectional encoder deep learning model in accordance with some embodiments discussed herein.

Figure 10:
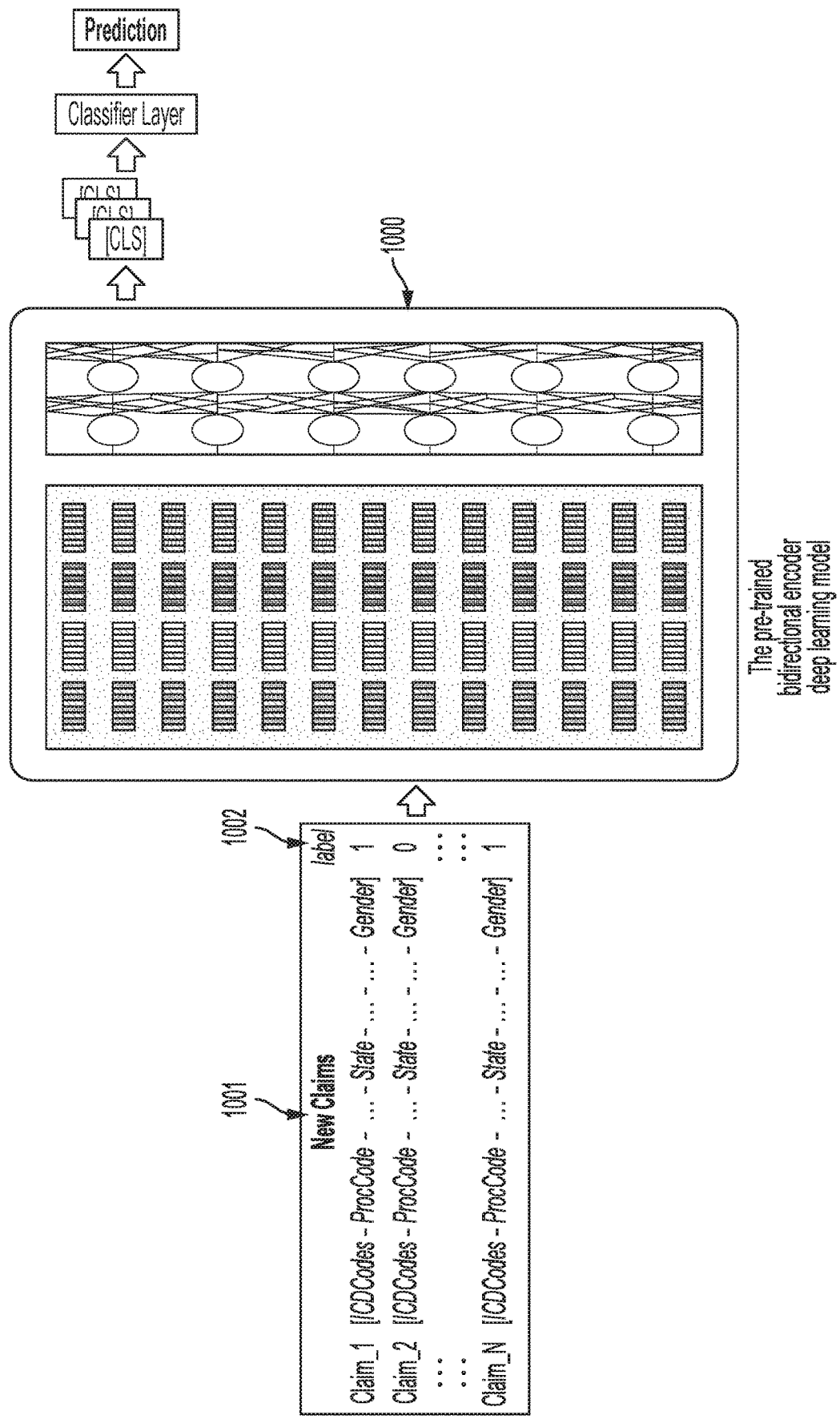

FIG. 10 provides an operational example of generating a trained bidirectional encoder deep learning model using a pretrained encoder deep learning model in accordance with some embodiments discussed herein.

Figure 11:
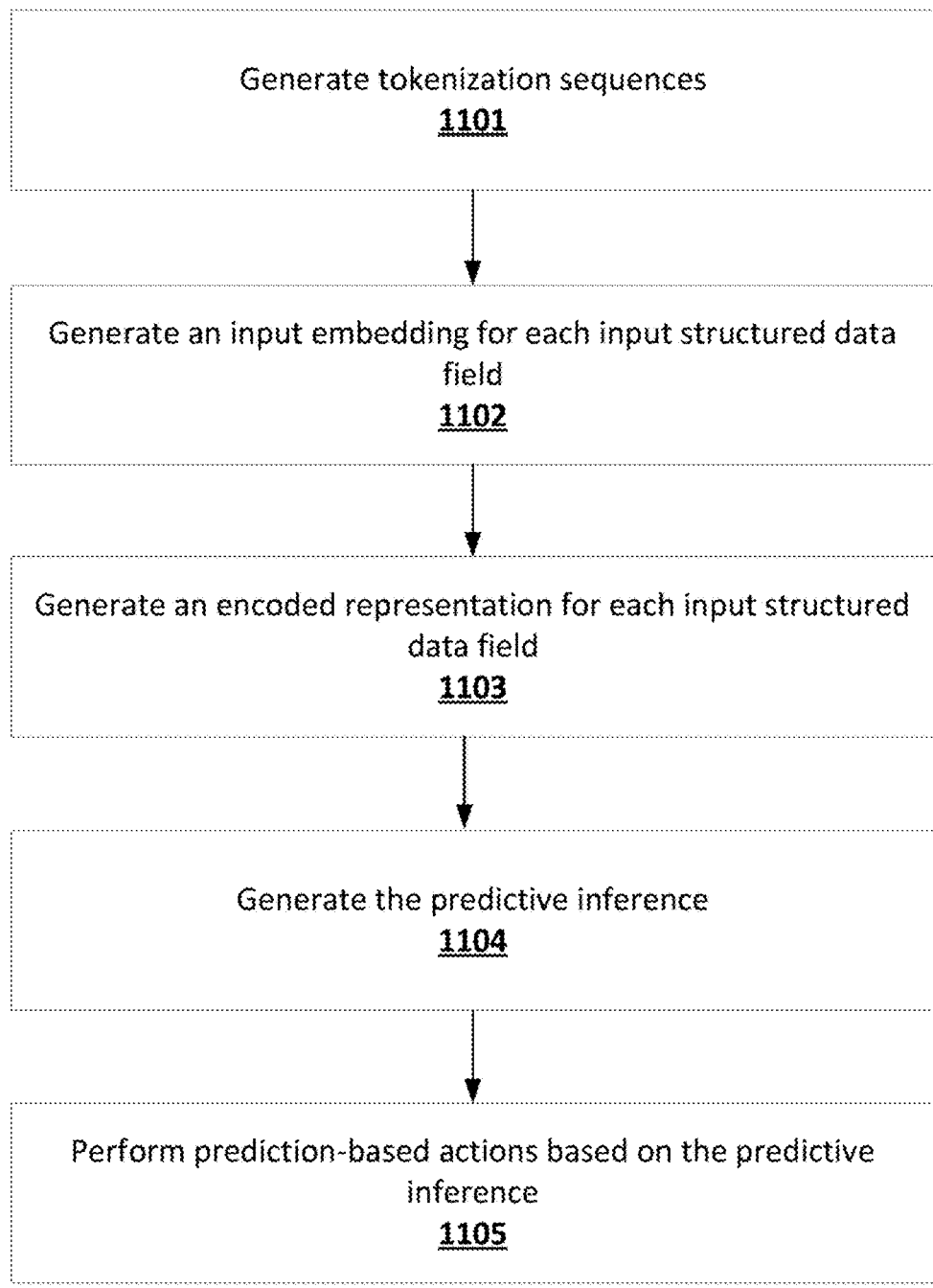

FIG. 11 is a flowchart diagram of an example process for performing prediction-based actions using a trained bidirectional encoder deep learning model in accordance with some embodiments discussed herein.

Figure 12:
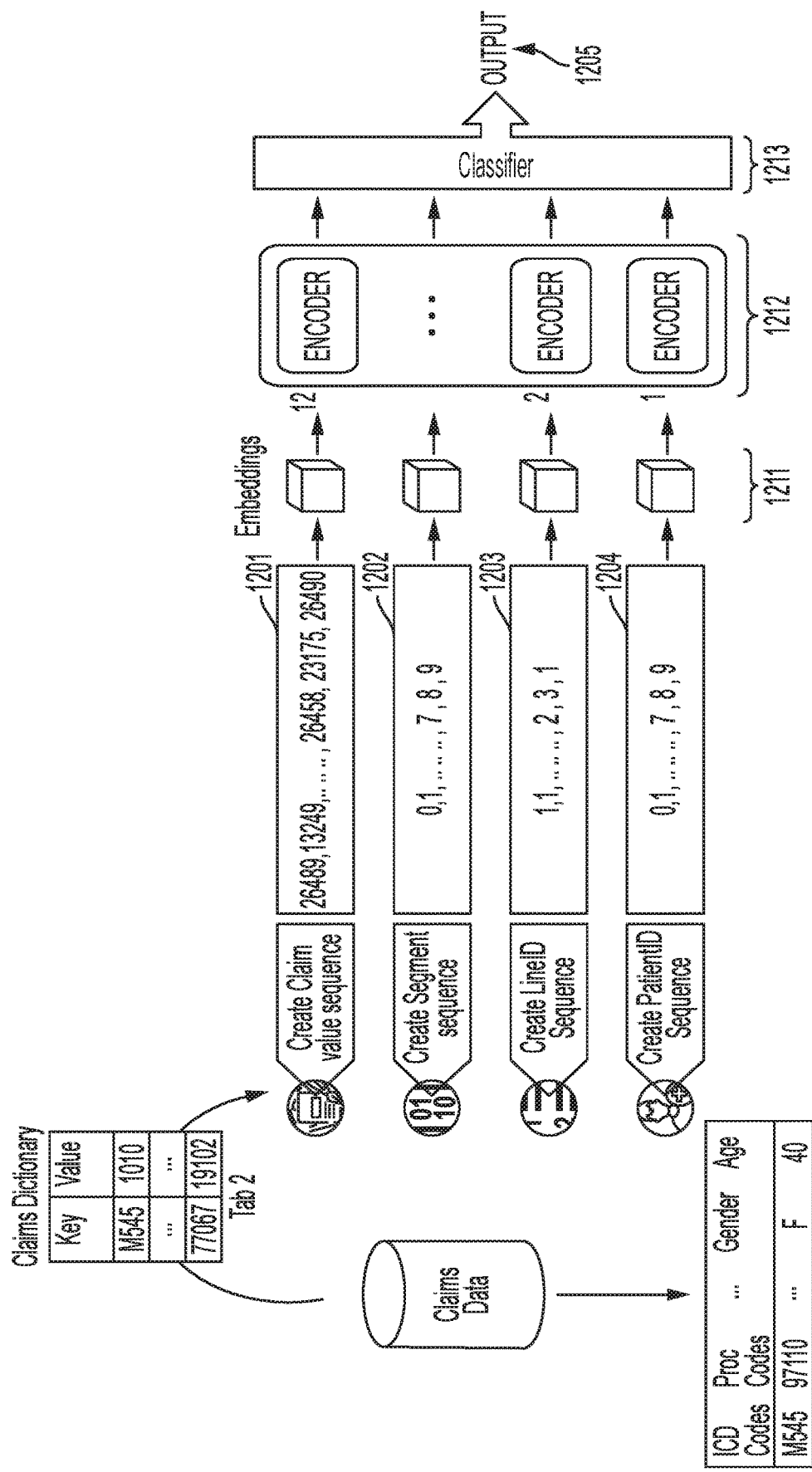

FIG. 12 provides an operational example of performing prediction-based actions using a trained bidirectional encoder deep learning model in accordance with some embodiments discussed herein.

Figure 13:
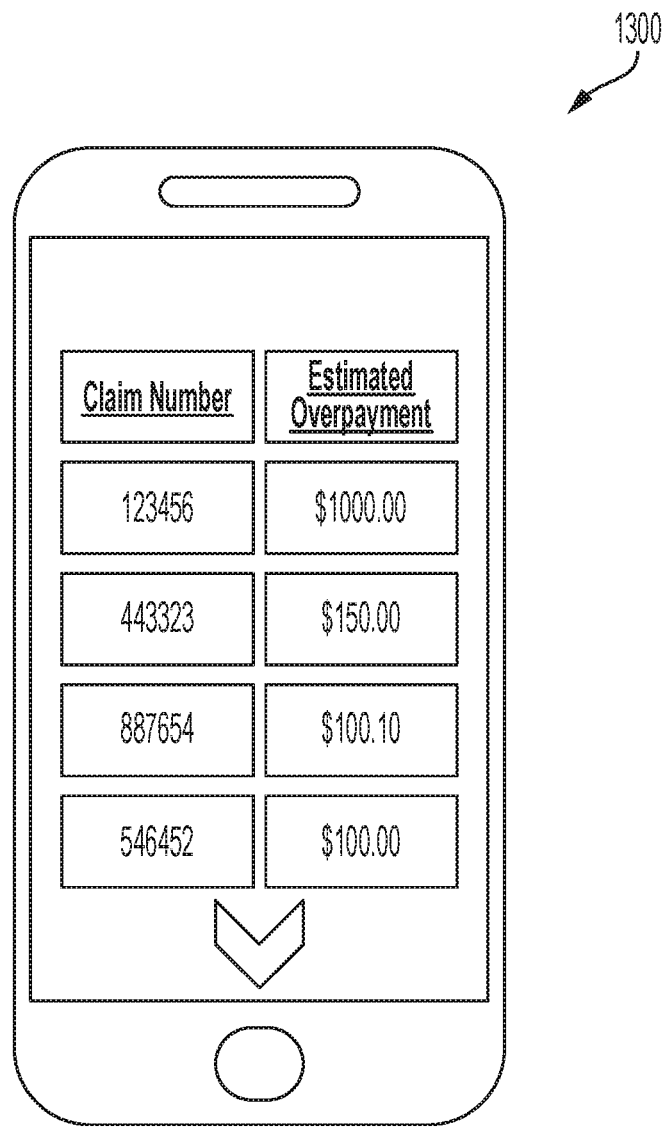

FIG. 13 provides an operational example of a predictive output user interface in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview

Various embodiments of the present invention improve techniques for performing predictive data analysis using structured data that: (i) are configured to learn cross-entry relationships between various structured data entries, cross-field relationships between various structured data fields of a single structured data entry, and cross-segment relationships between various data entry segments of a single structured data entry; and/or (ii) can be trained without labeled training data.

For example, various embodiments of the present invention disclose performing deep learning using tokenized representations of structured data fields that take into account at least one of tokenized representations of field values of those structured data fields, tokenized representations of field types of those structured data fields, tokenized representations of predictive entities of those structured data fields, tokenized representations of data entries of those structured data fields, tokenized representations of data entry segments of those structured data fields, and tokenized representations of indexed features of those structured data fields. By integrating the noted tokenized representations into an encoding process, the noted embodiments of the present invention learn cross-entry relationships between various structured data entries, cross-field relationships between various structured data fields of a single structured data entry, and cross-segment relationships between various data entry segments of a single structured data entry.

Furthermore, various embodiments of the present invention enable training encoder deep learning models at least in part by masking portions of tokenized representations associated with particular structured data entries and optimizing reconstruction of unmasked tokenized representations. In doing so, various embodiments of the present invention disclose techniques for training deep learning models configured to process structured data that can be trained without labeled training data.

Both of the functionalities noted above (e.g., learning cross-entry relationships between various structured data entries, cross-field relationships between various structured data fields of a single structured data entry, and cross-segment relationships between various data entry segments of a single structured data entry as well as training deep learning models configured to process structured data without labeled training data) reduce the amount of training data needed to train the noted predictive models, which in turn: (i) increases the training efficiency of those predictive models by decreasing the number of training iterations needed to train the predictive models, (ii) increases the effectiveness of the noted predictive models in predictive contexts that have lower amounts of available labeled training data, and (iii) increases the amount of training data that need to be stored on servers configured to train the noted predictive models. Through enabling the three above-noted technological advantages, various embodiments of the present invention improve the training efficiency of predictive models utilized to process structured data, improve the training accuracy of predictive models utilized to process structured data, and reduce storage costs of training predictive models utilized to process structured data. In doing so, various embodiments of the present invention make important technical contributions to the field of predictive data analysis by substantially improving the training computational efficiency, the training storage efficiency, and the training operational reliability of various existing predictive data analysis frameworks.

Moreover, various embodiments of the present invention provide techniques for generating representations of health-related claim data that can detect stable patterns across the noted health-related claim data objects by utilizing bidirectional encoders. Through experimentation and analysis, the inventors have discovered the predictive capability of attention-based encoders designed to detect stable patterns that can be in different locations inside documents of varying length. There are strong relationships within claim documents—such as the relationship between procedure codes, modifiers, and diagnosis codes—as well as progressive relationships of claim attribute values within the sequence of a member's claims. For example, specialty facilities would for a large part have similar procedures codes. Using a complex deep learning model further enables the encoding of a vast amount of information (e.g., claim rework information, fraud information, disease development information, medical coding information, and/or the like) into an encoded representation. Moreover, according to some aspects of the present invention, disclosed transformer models can capture an event in the context of attributes and in relation to other events in the patient's history.

According to some aspects of the present invention, in order to learn a patient's health journey, claims that are ordered chronologically by patient when fed to a model. To do this may require restricting historical healthcare data. According to some embodiments of the present invention, using the patient's history to represent the claim: (i) data is pulled from the highway and into a data frame format; (ii) each claim is assigned to one of multiple files according to patient identifier, where all claims that have been gathered for a patient are stored (this ensures that a single patient's claims are stored in the same file, and can be loaded to the model at once); (iii) using a deep learning framework such as Pytorch, data-loaders load the sequence of claims per patient, and thus the sequence of patients, into the model (loading in batches allows the large volume of data to be held in CPU memory and transferred to GPU in batches of sequenced samples as needed); and (iv) upon creation of each framework batch (e.g., each Pytorch batch), some final manipulation of the data is carried out (e.g., group claims are shuffled by patient identifier, sorted chronologically, and then the order of the groups is shuffled, maintaining the chronological order within the group). In some embodiments, the order is shuffled so that the model does not get supplied with the same sequence of claims every training run as this can lead to overfitting of the model.

Various embodiments of the present invention relate to processing claim data (e.g., health insurance claim data) and member data (e.g., health insurance member data). In various embodiments, a claim may be a request for payment/reimbursement for a consultation with a primary care doctor, a medical procedure or an evaluation performed by an orthopedic surgeon, a laboratory test performed by a laboratory, a surgery, durable medical equipment provided to an injured member, medications or other materials used in the treatment of a member, and/or the like. Example claim features may include a claim ID and the date a claim was received—e.g., Dec. 14, 2013, at 12:00:00 pm and time stamped as 2013-12-14 12:00:00. The claim features may also include one or more diagnostic codes, treatment codes, treatment modifier codes, and/or the like. Such codes may be any code, such as Current Procedural Terminology (CPT) codes, billing codes, Healthcare Common Procedure Coding System (HCPCS) codes, ICD-10-CM Medical Diagnosis Codes, and/or the like. The member data may comprise member information/data, member features, and/or similar words used herein interchangeably that can be associated with a given member, claim, and/or the like. In some embodiments, member data can include age, gender, poverty rates, known health conditions, home location, profession, access to medical care, medical history, claim history, member identifier (ID), and/or the like. Member data may also include marital status, employment status, employment type, socioeconomic information/data (e.g., income information/data), relationship to the primary insured, insurance product information/data, insurance plan information/data, member classifications, language information/data, and/or the like.

II. Definitions

The term "structured data field" may refer to a data object that describes a unit of attribute data in a structured data repository. For example, given a structured data repository that includes one or more relational data tables, a structured data field may describe a column value for a particular row of a relational data table. As another example, given a structured data repository that includes one or more graph-based databases, a structured data field may describe an attribute of a particular node of a graph-based database. As yet another example, given a structured data repository that includes information about one or more claim data entries (e.g., one or more health insurance claim data entries), a structured data field may describe an attribute of a particular claim data entry (e.g., the patient identifier of a particular claim data entry, the claim identifier of a particular claim data entry, the diagnosis code of a particular claim data entry, and/or the like).

The term "field value" may refer to a data object that describes the attribute data associated with a corresponding structured data field. For example, given a structured data field that describes the age attribute of the nth row of a relational data table, the field value for the noted structured data field value may describe the actual value of the noted structured field value, which may for example be twenty. As another example, given a structured data field that describes the location attribute of the mth node of a graph-based database, the field value for the noted structured data field value may describe the actual value of the noted structured field value, which may for example be Atlanta, Ga. As yet another example, given a structured data field that describes the diagnosis code of a particular claim data entry, the field value for the noted structured data field value may describe the actual value of the noted structured field value, which may for example be Z0189.

The term "field value tokenized value" may refer to a data object that describes a unique numeric representation of a corresponding field value. In some embodiments, to determine field value tokenized values, a computing entity may determine the field value tokenized value for a training structured data field by mapping the field value for the training structured data field to a unique numeric index to which is associated with a numeric vector representation based at least in part on a tokenization dictionary that maps each term in a list of terms within a defined vocabulary (e.g., a defined vocabulary of common terms used in the structured data fields, such as a defined vocabulary of common medical terms) to a corresponding numeric representation (e.g., a corresponding scalar numeric representation, a corresponding vectorized numeric representation, and/or the like).

The term "field type" may refer to a data object that describes a type of attribute data associated with a corresponding structured data field according to a data schema of a structured data repository that includes the corresponding structured data field. For example, given a structured data field that describes a value in a relational table, the field type of the noted structured data field may describe the data type described by the column of the structured data field (e.g., the age data type, the address data type, and/or the like). As another example, given a structured data field that describes a node attribute value in a graph-based database, the field type of the noted structured data field may describe the data type described by the node attributer value (e.g., the age data type, the address data type, and/or the like). As yet another example, given a structured data field that describes the diagnosis code of a particular claim data entry, the field type of the noted structured data field may describe a diagnosis code data type.

The term "field type tokenized value" may refer to a data object that describes a unique numeric representation of a corresponding field type. In some embodiments, to determine field type tokenized values, a computing entity may order a list of field types and assign a numeric representation to each of the field types (e.g., assign a numeric representation of one to a first field type in the order, a numeric representation of two to a second field type in the order, and so on).

The term "predictive entity" may refer to a data object that describes a common attribute of a collection of data entries that are all deemed related to a common subject matter. For example, given a structured data repository that describes claim data entries (e.g., health insurance claim data entries), a predictive entity may describe a customer identifier (e.g., a patient identifier) associated with a collection of data entries (e.g., a collection of health insurance claim data entries) that are deemed to collectively be associated with a common predictive entity. In the noted example, structured data fields associated with two or more claim data entries may be associated with the same customer identifier, which in turn causes those structured data fields to be associated with a common predictive entity identifier despite belonging to different claim data entries.

The term "predictive entity tokenized value" may refer to a data object that describes a unique numeric representation of a corresponding predictive entity. In some embodiments, to determine predictive entity tokenized values, a computing entity may order a list of predictive entities (e.g., a list of customer identifiers) and assign a numeric representation to each of the predictive entities (e.g., assign a numeric representation of one to a first customer identifier in the order, a numeric representation of two to a second customer identifier in the order, and so on).

The term "data entry" may refer to a data object that describes a common attribute of a collection of structured data fields that are all deemed related to a common recorded event. For example, given a group of structured data fields that comprise structured data fields describing features/attributes of various claim data entries (e.g., various health insurance claim data entries), a data entry may describe the claim identifier attribute of a subset of the group of structured data fields that all relate to a common claim identifier. In the noted example, if the group of structured data fields are data values in a relational database, each data entry may correspond to a row of a relational data table. Moreover, if in the noted example the group of structured data values are data values in a graph-based database, each data entry may correspond to a claim data entry node of the graph-based database.

The term "data entry tokenized value" may refer to a data object that describes a unique numeric representation of a corresponding data entry. In some embodiments, to determine data entry tokenized values, a computing entity may order a list of data entries (e.g., a list of claim identifiers) and assign a numeric representation to each of the data entries (e.g., assign a numeric representation of one to a first claim identifier in the order, a numeric representation of two to a second claim identifier in the order, and so on).

The term "data entry segment" may refer to a data object that describes a common attribute of a collection of structured data fields that are all deemed related to a common segment of a recorded event that is associated with a corresponding data entry. For example, given a data entry that corresponds to a claim data entry (e.g., a health insurance claim data entry), a data entry segment may describe a claim line of the noted claim data entry. In the noted example, a claim data entry may be associated with two or more claim lines, which in turn causes the claim data entry to comprise claim segments each including structured data fields that pertain to a claim line of the one or more claim lines. As another example, given a data entry that corresponds to a claim data entry (e.g., a health insurance claim data entry), a data entry segment may describe a diagnosis code associated with the noted claim data entry. In the noted example, a claim data entry may be associated with two or more diagnosis codes (e.g., the medical services event associated with the claim data entry may have concerned two or more diagnosed conditions), which in turn causes the claim data entry to comprise claim segments each including structured data fields that describe properties of the medical services performed in relation to a particular diagnosis code of the two or more diagnosis codes.

The term "data entry segment tokenized value" may refer to a data object that describes a unique numeric representation of a corresponding data entry segment. In some embodiments, to determine data entry segment tokenized values, a computing entity may order a list of data entry segments (e.g., a list of claim lines) and assign a numeric representation to each of the data entry segments (e.g., assign a numeric representation of one to a first claim line in the order, a numeric representation of two to a second claim line in the order, and so on).

The term "pretrained bidirectional encoder deep learning model" may refer to a data object that describes the parameters and/or hyperparameters of a deep learning model that is configured to process per-field tokenized values for a training structured data field in order to generate an encoded representation of the training structured data field, where the deep learning model is trained to learn both a forward-direction ordering of a group of training structured data fields and a backward-direction ordering of the group of structured data fields. For example, given a structured data field $F_2$ that follows a structured data field $F_1$ and precedes a structured data field $F_3$, a pretrained bidirectional encoder deep learning model may be configured to generate an encoded representation of the structured data field $F_2$ that both describes that the structured data field $F_2$ follows the structured data field $F_1$ and the structured data field $F_2$ precedes the structured data field $F_3$. In some embodiments, the trained bidirectional encoder deep learning model is a trained Bidirectional Encoder Representations from Transformers (BERT) model, such as a trained BERT model that is trained from scratch and/or a trained BERT model that is generated by retraining a pretrained BERT model.

The term "masked tokenized representation" may refer to a data object that describes a portion of the per-field tokenized representations associated with a corresponding training structured data field as masked values. For example, given a structured data field that is associated with the per-field tokenized value $V_1$, the per-field tokenized value $V_2$, the per-field tokenized value $V_3$, and the per-field tokenized value $V_4$, the masked tokenized representation may describe the following ordering of values: $\{V_1, MASK,$ $V_3, V_4\}$, where MASK represents a masking value (e.g., a null value, a predefined masking value, and/or the like). As another example, given a structured data field that is associated with the per-field tokenized value $V_1$, the per-field tokenized value $V_2$, the per-field tokenized value $V_3$, the per-field tokenized value $V_4$, the per-field tokenized value $V_5$, and the per-field tokenized value $V_6$, the masked tokenized representation of the masked tokenized representation may describe the following ordering of values: $\{V_1, MASK, V_3, V_4, MASK, V_6\}$, where MASK represents a masking value.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing health-related predictive data analysis. The architecture 100 includes a predictive data analysis system 101 configured to receive predictive data analysis requests from external computing entities 102, process the predictive data analysis requests to generate predictions, provide the generated predictions to the external computing entities 102, and automatically perform prediction-based actions based at least in part on the generated predictions.

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more external computing entities 102, process the predictive data analysis requests to generate predictions corresponding to the predictive data analysis requests, provide the generated predictions to the external computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-F$_1$), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-F$_1$, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

FIG. 4 is a flowchart diagram of an example process 400 for performing predictive data analysis based at least in part on structured data. Via the various steps/operations of the process 400, the predictive data analysis computing entity 106 can generate predictive models that: (i) are configured to learn cross-entry relationships between various structured data entries, cross-field relationships between various structured data fields of a single structured data entry, and cross-segment relationships between various data entry segments of a single structured data entry; and/or (ii) can be trained without labeled training data. This in turn reduces the amount of training data needed to train the noted predictive models, which in turn increases the training efficiency of those predictive models as well as the effectiveness of those predictive models in predictive contexts that have lower amounts of available training data.

The process 400 begins at step/operation 401 when the predictive data analysis computing entity 106 identifies a plurality of training structured data fields, where each training structured data field may be associated with a field value, a field type, a predictive entity, a data entry, and a data entry segment. Aspects of structured data fields, field values, field types, predictive entities, data entries, and data entry segments are described in greater detail below.

A structured data field may describe a unit of attribute data in a structured data repository. For example, given a structured data repository that includes one or more relational data tables, a structured data field may describe a column value for a particular row of a relational data table. As another example, given a structured data repository that includes one or more graph-based databases, a structured data field may describe an attribute of a particular node of a graph-based database. As yet another example, given a structured data repository that includes information about one or more claim data entries (e.g., one or more health insurance claim data entries), a structured data field may describe an attribute of a particular claim data entry (e.g., the patient identifier of a particular claim data entry, the claim identifier of a particular claim data entry, the diagnosis code of a particular claim data entry, and/or the like).

A field value may describe the attribute data associated with a corresponding structured data field. For example, given a structured data field that describes the age attribute of the nth row of a relational data table, the field value for the noted structured data field value may describe the actual value of the noted structured field value, which may for example be twenty. As another example, given a structured data field that describes the location attribute of the mth node of a graph-based database, the field value for the noted structured data field value may describe the actual value of the noted structured field value, which may for example be Atlanta, Ga. As yet another example, given a structured data field that describes the diagnosis code of a particular claim data entry, the field value for the noted structured data field value may describe the actual value of the noted structured field value, which may for example be the value Z0189.

A field type may describe a type of attribute data associated with a corresponding structured data field according to a data schema of a structured data repository that includes the corresponding structured data field. For example, given a structured data field that describes a value in a relational table, the field type of the noted structured data field may describe the data type described by the column of the structured data field (e.g., the age data type, the address data type, and/or the like). As another example, given a structured data field that describes a node attribute value in a graph-based database, the field type of the noted structured data field may describe the data type described by the node attributer value (e.g., the age data type, the address data type, and/or the like). As yet another example, given a structured data field that describes the diagnosis code of a particular claim data entry, the field type of the noted structured data field may describe a diagnosis code data type.

A data entry may describe a common attribute of a collection of structured data fields that are all deemed related to a common recorded event. For example, given a group of structured data fields that comprise structured data fields describing features/attributes of various claim data entries (e.g., various health insurance claim data entries), a data entry may describe the claim identifier attribute of a subset of the group of structured data fields that all relate to a common claim identifier. In the noted example, if the group of structured data fields are data values in a relational database, each data entry may correspond to a row of a relational data table. Moreover, if in the noted example the group of structured data values are data values in a graph-based database, each data entry may correspond to a claim data entry node of the graph-based database.

A data entry segment may describe a common attribute of a collection of structured data fields that are all deemed related to a common segment of a recorded event that is associated with a corresponding data entry. For example, given a data entry that corresponds to a claim data entry (e.g., a health insurance claim data entry), a data entry segment may describe a claim line of the noted claim data entry. In the noted example, a claim data entry may be associated with two or more claim lines, which in turn causes the claim data entry to comprise claim segments each including structured data fields that pertain to a claim line of the one or more claim lines. As another example, given a data entry that corresponds to a claim data entry (e.g., a health insurance claim data entry), a data entry segment may describe a diagnosis code associated with the noted claim data entry. In the noted example, a claim data entry may be associated with two or more diagnosis codes (e.g., the medical services event associated with the claim data entry may have concerned two or more diagnosed conditions), which in turn causes the claim data entry to comprise claim segments each including structured data fields that describe properties of the medical services performed in relation to a particular diagnosis code of the two or more diagnosis codes.

A predictive entry may describe a common attribute of a collection of data entries that are all deemed related to a common subject matter. For example, given a structured data repository that describes claim data entries (e.g., health insurance claim data entries), a predictive entity may describe a customer identifier (e.g., a patient identifier) associated with a collection of data entries (e.g., a collection of health insurance claim data entries) that are deemed to collectively be associated with a common predictive entity. In the noted example, structured data fields associated with two or more claim data entries may be associated with the same customer identifier, which in turn causes those structured data fields to be associated with a common predictive entity identifier despite belonging to different claim data entries.

An operational example of a structured data object portion 500 that depicts a group of structured data fields is presented in FIG. 5. The structured data object portion 500 is a portion of a structured data object that conforms to the Electronic Data Interchange (EDI) 837 format and describes a health-related claim data entry. However, while various embodiments of the present invention describe using structured data objects that conform to EDI 837 formats, a person of ordinary skill in the relevant technology will recognize that the disclosed techniques can be utilized to process structured data objects having other formats in addition to EDI 837 and/or having other formats instead of EDI 837.

In the structured data object portion 500 of FIG. 5, a claim line may include a collection of related lines of the structured data object portion 500 that include a particular line having an LX segment identifier as well as lines subsequent to the particular line up to a subsequent line having an LX segment identifier. For example, the line collection 501 is an example of a portion of a claim line associated with the LX segment identifier 502. Claim line is an example of a unit of data that can deemed to constitute a data entry segment according to some aspects of the present invention, such that structured data fields that are associated with a common claim line may be deemed to be associated with the same data entry segment. In some embodiments, in addition to or instead of claim lines, the whole claim may be deemed to constitute a data entry segment.

Returning to FIG. 4, at step/operation 402, the predictive data analysis computing entity 106 generates a plurality of per-field tokenized values for each training structured data field of the plurality of training structured data fields, where the plurality of per-field tokenized values for a training structured data field of the plurality of training structured data fields comprise: a field value tokenized value for the training structured data field that is generated based at least in part on the field value for the training structured data field, a field type tokenized value for the training structured data field that is generated based at least in part on the field type for the training structured data field, a predictive entity tokenized value for the training structured data field that is generated based at least in part on the predictive entity for the training structured data field, a data entry tokenized value for the training structured data field that is generated based at least in part on the data entry for the training structured data field, and a data entry segment tokenized value for the training structured data field that is generated based at least in part on the data entry segment for the structured data field.

In some embodiments, subsequent to determining the field value for a training structured data field, the field type for the training structured data field, the predictive entity for the training structured data field, the data entry for the training structured data field, and the data entry segment for the training structured data field, the predictive data analysis computing entity 106 assigns a unique numeric representation to each of the noted properties of the structured data field.

For example, the predictive data analysis computing entity 106 may determine the field value tokenized value for a training structured data field by mapping the field value for the training structured data field to a unique numeric representation based at least in part on a tokenization dictionary that maps each term in a list of terms within a defined vocabulary (e.g., a defined vocabulary of common terms used in the structured data fields, such as a defined vocabulary of common medical terms) to a corresponding numeric representation (e.g., a corresponding scalar numeric representation, a corresponding vectorized numeric representation, and/or the like). As another example, the predictive data analysis computing entity 106 may order a list of field types and assign a numeric representation to each of the field types (e.g., assign a numeric representation of one to a first field type in the order, a numeric representation of two to a second field type in the order, and so on). As an additional example, the predictive data analysis computing entity 106 may order a list of predictive entities (e.g., a list of customer identifiers) and assign a numeric representation to each of the predictive entities (e.g., assign a numeric representation of one to a first customer identifier in the order, a numeric representation of two to a second customer identifier in the order, and so on). As yet another example, the predictive data analysis computing entity 106 may order a list of data entries (e.g., a list of claim identifiers) and assign a numeric representation to each of the data entries (e.g., assign a numeric representation of one to a first claim identifier in the order, a numeric representation of two to a second claim identifier in the order, and so on). As a further example, the predictive data analysis computing entity 106 may order a list of data entry segments (e.g., a list of claim lines) and assign a numeric representation to each of the data entry segments (e.g., assign a numeric representation of one to a first claim line in the order, a numeric representation of two to a second claim line in the order, and so on).

In some embodiments, in addition to the field value tokenized value, the field type tokenized value, the predictive entity tokenized value, the data entry tokenized value, and the data entry segment tokenized value, the per-field tokenized values tokenized values for a structured data field include an indexed feature tokenized value for each indexed feature of the one or more indexed features that are associated with the training structured data field. The indexed features could be any feature associated with a training structured data field that is tokenized and included as part of the per-field tokenized values. For example, given a training structured data field that is a data field in a health-related claim entry, the indexed features can include at least one of patient attributes (e.g., patient age, patient ethnicity, patient zip code, and/or the like) or claim attributes (e.g., provider identifier, service zip code, provider age, provider expertise level, claim service date, and/or the like).

Accordingly, in some embodiments, each claim data field of the plurality of data fields is associated with one or more patient attribute values; and each plurality of per-field tokenized values for a claim data field of the plurality of data fields comprise one or more patient attribute tokenized values generated based at least in part on the one or more patient attribute values for the claim data field. Furthermore, in some embodiments, each claim data field of the plurality of data fields is associated with one or more claim attribute values; and each plurality of per-field tokenized values for a claim data field of the plurality of data fields comprise one or more claim attribute tokenized values generated based at least in part on the one or more claim attribute values for the claim data field. Moreover, in some embodiments, each claim data field of the plurality of data fields is associated with one or more provider attribute values; and each plurality of per-field tokenized values for a claim data field of the plurality of data fields comprise one or more provider attribute tokenized values generated based at least in part on the one or more provider attribute values for the claim data field.

An operational example of per-field tokenized values for structured data fields 601 is depicted in FIG. 6. As depicted in FIG. 6, the per-field tokenized values for each structured data field include a feature value tokenized value 611, a feature type tokenized value 612, a data entry tokenized value 613 (which in this case is a claim identifier tokenized value), and a data entry segment tokenized value 614 (which in this case is a claim line tokenized value). For example, as depicted in FIG. 6, the structured data field 621 is associated with: (i) the field value tokenized value of 26489, which may be a tokenization of CLS, a special token added at the start of a sequence containing claim codes for a patient, and which is used during the fine-tuning process to represent the entire sequence; (ii) the field type tokenized value of 0, which may be a tokenization of the corresponding claim line identifier field type associated with the structured data field 621; (iii) the data entry tokenized value of 1, which may be a tokenization of the corresponding claim associated with the structured data field 621; and (iv) the data entry segment tokenized value of 0, which may be a tokenization of the corresponding claim line associated with the structured data field 621.

Returning to FIG. 4, at step/operation 403, the predictive data analysis computing entity 106 generates a pretrained bidirectional encoder deep learning model based at least in part on each plurality of per-field tokenized values for a training structured data field of the plurality of training structured data fields. In some embodiments, the predictive data analysis computing entity 106 uses the per-field tokenized values for each training structured data field to train a deep learning model that is configured to encode a structured data field based at least in part on the per-field tokenized values for the training structured data field.

The pretrained bidirectional encoder deep learning model may be a deep learning model that is configured to process per-field tokenized values for a training structured data field in order to generate an encoded representation of the training structured data field, where the deep learning model is trained to learn both a forward-direction ordering of a group of training structured data fields and a backward-direction ordering of the group of structured data fields. For example, given a structured data field $F_2$ that follows a structured data field $F_1$ and precedes a structured data field $F_3$, a pretrained bidirectional encoder deep learning model may be configured to generate an encoded representation of the structured data field $F_2$ that both describes that the structured data field $F_2$ follows the structured data field $F_1$ and the structured data field $F_2$ precedes the structured data field $F_3$. In some embodiments, the pretrained bidirectional encoder deep learning model is a trained Bidirectional Encoder Representations from Transformers (BERT) model, such as a trained BERT model that is trained from a scratch and/or a trained BERT model that is generated by retraining a pretrained BERT model.

In some embodiments, step/operation 403 may be performed in accordance with the process depicted in FIG. 7. The process depicted in FIG. 7 begins at step/operation 701 when the predictive data analysis computing entity 106 generates a masked tokenized representation of each training structured data field based at least in part on an unmasked subset of the per-field tokenized representations associated with the training structured data field. In some embodiments, the predictive data analysis computing entity 106 randomly masks a predefined ratio (e.g., 15%) of the per-field tokenized values associated with a training structured data field and generates a masked tokenized representation that describes each unmasked per-field tokenized representation as well as a masked value to represent each masked per-field tokenized representation.

A masked tokenized representation may be a data object that describes a portion of the per-field tokenized representations associated with a corresponding training structured data field as masked values. For example, given a structured data field that is associated with the per-field tokenized value $V_1$, the per-field tokenized value $V_2$, the per-field tokenized value $V_3$, and the per-field tokenized value $V_4$, the masked tokenized representation of the masked tokenized representation may describe the following ordering of values: $\{V_1, MASK, V_3, V_4\}$, where MASK represents a masking value (e.g., a null value, a predefined masking value, and/or the like). As another example, given a structured data field that is associated with the per-field tokenized value $V_1$, the per-field tokenized value $V_2$, the per-field tokenized value $V_3$, the per-field tokenized value $V_4$, the per-field tokenized value $V_5$, and the per-field tokenized value $V_6$, the masked tokenized representation of the masked tokenized representation may describe the following ordering of values: $\{V_1, MASK, V_3, V_4, MASK, V_6\}$, where MASK represents a masking value (e.g., a null value, a predefined masking value, and/or the like).

An operational example of a group of masked tokenized representations is depicted in FIG. 8. As depicted in FIG. 8, each masked tokenized representation includes a masked value. For example, the masked tokenized representation that corresponds to the first depicted structured data field is associated with a masked procedure code value. As another example, the masked tokenized representation that corresponds to the second depicted structured data field is associated with a masked International Classification of Diseases (ICD) code value. As yet another example, the masked tokenized representation that corresponds to the nth depicted structured data field is associated with a masked state identifier value.

Returning to FIG. 7, at step/operation 702, the predictive data analysis computing entity 106 generates a pretrained bidirectional encoder deep learning model based at least in part on each masked tokenized representation for a training structured data field of the plurality of training structure data fields. In some embodiments, the predictive data analysis computing entity 106 trains the bidirectional encoder deep learning model based at least in part on a training task that seeks to minimize deviations between predicted values corresponding to the masked portions of the masked tokenized representations and the unmasked tokenized representations of the structured data field. For example, during each training iteration, the predictive data analysis computing entity 106 may process a masked tokenized representation for a structured data field using the bidirectional encoder deep learning model to generate predicted values for each masked value in the masked tokenized representation and subsequently update the parameters of the bidirectional encoder deep learning model based at least in part on a deviation between the predicted values for each masked value in the masked tokenized representation and the actual values for those masked values.

An operational example of generating a pretrained bidirectional encoder deep learning model is depicted in FIG. 9. As depicted in FIG. 9, generating the pretrained bidirectional encoder deep learning model includes generating predicted values for each masked value in a masked tokenized representation of a structured data field. For example, as depicted in FIG. 9, the bidirectional encoder deep learning model 900 generates the predicted value 911 for the masked value 901 in the masked tokenized representation 921.

Returning to FIG. 7, at step/operation 703, the predictive data analysis computing entity 106 processes one or more labeled structured data fields using the pretrained bidirectional encoder deep learning model in order to generate an inferred label for each labeled structured data field of the one or more labeled structured data fields. In some embodiments, the predictive data analysis computing entity 106 processes each labeled structured data field (e.g., each structured data field that is associated with a ground-truth classification label) using the pretrained bidirectional encoder deep learning model 900 to generate an inferred label for the labeled structured data field. For example, as depicted in FIG. 10, the pretrained bidirectional deep learning model 1000 with the addition of a classification layer may process each labeled data field 1001 that is associated with a ground-truth label 1002 in order to infer labels for the structured data field.

At step/operation 704, the predictive data analysis computing entity 106 uses the pretrained bidirectional encoder deep learning model to infer labels for structured data. In some embodiments, to perform the steps/operations 703-704, the tokenized labeled structured data fields are passed to the pretrained bidirectional encoder deep learning model to generate a final vector representation. The final vector representation corresponding to the input token (e.g., CLS) is used as the aggregate representation. The final vector representation may then be fed as input into an output layer for the training on a specific task (e.g. classification).

Returning to FIG. 4, at step/operation 404, the predictive data analysis computing entity 106 performs one or more prediction-based actions based at least in part on (e.g., using) the trained bidirectional encoder deep learning model. In some embodiments, subsequent to generating the trained bidirectional encoder deep learning model, the predictive data analysis computing entity 106 utilizes the predictive data analysis computing entity 106 to process input structured data fields in order to generate a corresponding predictive inference for each input structured data field and displays a predictive output user interface based at least in part on each predictive inference for an input structured data field of the noted one or more input structured data fields.

In some embodiments, step/operation 404 may be performed in accordance with the process depicted in FIG. 11. The process depicted in FIG. 11 begins at step/operation 1101 when the predictive data analysis computing entity 106 generates, based at least in part on one or more input structured data fields, a plurality of input tokenization sequences, where the plurality of input tokenization sequences comprise a field value tokenization sequence, a field type tokenization sequence, a predictive entity tokenization sequence, a data entry tokenization sequence, and a data entry tokenization sequence. An operational example of four tokenization sequences is depicted in FIG. 12. As depicted in FIG. 12, the four tokenization sequences include a field value tokenization sequence 1201, a data entry tokenization sequence 1202, a data entry tokenization sequence 1203, and a predictive entity tokenization sequence 1204.

In some embodiments, the field value tokenization sequence includes each field value tokenized value for an input structured data field of the one or more input structured data fields. In some embodiments, the field type tokenization sequence includes each field type tokenized value for an input structured data field of the one or more input structured data fields. In some embodiments, the predictive entity tokenization sequence includes each predictive entity tokenized value for an input structured data field of the one or more input structured data fields. In some embodiments, the data entry tokenization sequence includes each data entry tokenized value for an input structured data field of the one or more input structured data fields. In some embodiments, the data entry tokenization segment sequence includes each data entry segment tokenized value for an input structured data field of the one or more input structured data fields.

In some embodiments, in addition to the field value tokenization sequence, the field type tokenization sequence, the predictive entity tokenization sequence, the data entry tokenization sequence, and the data entry tokenization sequence, the plurality of input tokenization sequences include one or more indexed feature tokenization sequences, where each indexed feature tokenization sequence that is associated with a particular indexed feature type includes each indexed feature tokenized value having the particular indexed feature for an input structured data field of the one or more input structured data fields. For example, the plurality of input tokenization sequences may include a patient age tokenization sequence that includes each patient age tokenized value for an input structured data field of the one or more input structured data fields. As another example, the plurality of input tokenization sequences may include a patient zip code tokenization sequence that includes each patient zip code tokenized value for an input structured data field of the one or more input structured data fields. As yet another example, the plurality of input tokenization sequences may include a provider identifier tokenization sequence that includes each provider identifier tokenized value for an input structured data field of the one or more input structured data fields.

At step/operation 1102, the predictive data analysis computing entity 106 processes the plurality of input tokenization sequences using an embedding model in order to generate an input embedding for each input structured data field of the one or more input structured data fields. For example, as depicted in FIG. 12, the embedding layer 1211 processes the input tokenization sequences 1201-1204 in order to generate the corresponding input embeddings which are then supplied as inputs to the pretrained bidirectional encoder deep learning model 1212.

At step/operation 1103, the predictive data analysis computing entity 106 processes each input embedding for an input structured data field of the one or more input structured data fields using the trained bidirectional encoder deep learning model to generate an encoded representation for the input structured data field. For example, as depicted in FIG. 12, the trained bidirectional encoder deep learning model 1212 processes the structured data to generate encoded representations. The vector representation corresponding to the input token [CLS] (encoded as 26489 at start of the sequence as per 1201) is used as the aggregate representation for the input. This aggregate representation is then fed as input into an output layer 1213 for the training on a specific task (e.g. classification task).

At step/operation 1104, the predictive data analysis computing entity 106 processes each encoded representation for an input structured data field of the one or more input structured data fields using a latent machine learning model (e.g., a classification machine learning model) in order to generate a predictive inference for the one or more input structured data fields. For example, as depicted in FIG. 12, the latent machine learning model 1213 processes each pretrained encoder deep learning model output representation to generate the predictive inference 1205. In some embodiments, the predictive inference for a particular input structured data field may determine whether a data entry (e.g., a claim data entry) associated with the one or more input structured data entries corresponds to an anomalous record (e.g., a fraudulent transaction, a record deemed to have an incorrectly supplied value, an overpaid claim, and/or the like). In some embodiments, the predictive inference for a particular input structured data field may determine whether a data entry (e.g., a claim data entry) associated with the one or more input structured data entries corresponds to a predefined health condition (e.g., a health condition requiring immediate attention, a health condition requiring prescription of a particular drug, and/or the like).

At step/operation 1105, the predictive data analysis computing entity 106 performs the one or more prediction-based actions based at least in part on the predictive inference. In some embodiments, performing the one or more prediction-based actions comprises enabling display of a predictive output user interface that describes the predictive inference. For example, the predictive output user interface may display a list of claims that are deemed to have been overpaid, as well as an overpayment amount for each claim. An operational example of such a predictive output user interface 1300 is presented in FIG. 13.

In some embodiments, the predictive data analysis computing entity 106 may determine one or more patient health predictions (e.g., one or more urgent care predictions, one or more medication need predictions, one or more visitation need predictions, and/or the like) based at least in part on the predictive inference and perform one or more prediction-based actions based at least in part on the noted determined patient health predictions. Examples of prediction-based actions that may be performed based at least in part on the patient health predictions include automated physician notifications, automated patient notifications, automated medical appointment scheduling, automated drug prescription recommendation, automated drug prescription generation, automated implementation of precautionary actions, automated hospital preparation actions, automated insurance workforce management operational management actions, automated insurance server load balancing actions, automated call center preparation actions, automated hospital preparation actions, automated insurance plan pricing actions, automated insurance plan update actions, and/or the like.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A computer-implemented method comprising:
identifying, by one or more processors, a plurality of training structured data fields that comprises at least one training structured data field that is associated with a plurality of attributes that comprises (i) a field value, (ii) a field type, (iii) a predictive entity comprising an identifier representative of a common attribute among the plurality of training structured data fields, (iv) a data entry, and (v) a data entry segment within the data entry;
generating, by the one or more processors and based at least in part on a tokenization dictionary, a plurality of per-field tokenized values based at least in part on the plurality of attributes, wherein the plurality of per-field tokenized values comprises:
(a) a field value tokenized value that is generated based at least in part on the field value, (b) a field type tokenized value that is generated based at least in part on the field type, (c) a predictive entity tokenized value that is generated based at least in part on the predictive entity, (d) a data entry tokenized value that is generated based at least in part on the data entry, and (e) a data entry segment tokenized value that is generated based at least in part on the data entry segment;
generating, by the one or more processors, a plurality of input tokenization sequences based at least in part on the plurality of per-field tokenized values, wherein the plurality of input tokenization sequences comprises a value tokenization sequence that is associated with the field value tokenized value, a field type tokenization sequence that is associated with the field type tokenized value, a predictive entity tokenization sequence that is associated with the predictive entity tokenized value, a data entry tokenization sequence that is associated with the data entry tokenized value, and a data entry tokenization segment sequence that is associated with the data entry segment tokenized value;
generating, by the one or more processors, a bidirectional encoder deep learning model that is trained to learn forward-direction ordering of the plurality of training structured data fields and a backward-direction ordering of the plurality of training structured data fields based at least in part on the plurality of input tokenization sequences; and
initiating, by the one or more processors, the performance of one or more prediction-based actions based at least in part on one or more outputs generated by the bidirectional encoder deep learning model.

2. The computer-implemented method of claim 1, wherein generating the bidirectional encoder deep learning model comprises:
generating a masked tokenized representation based at least in part on an unmasked subset of the plurality of per-field tokenized values that are associated with the at least one training structured data field;
generating the bidirectional encoder deep learning model based at least in part on the masked tokenized representation;
generating, based at least in part on one or more labeled structured data fields and the bidirectional encoder deep learning model, an output representation; and
using the output representation as input to a machine learning layer that is configured to generate an inferred label for each labeled structured data field of the one or more labeled structured data fields.

3. The computer-implemented method of claim 1, wherein initiating the performance of the one or more prediction-based actions comprises:
providing access to the bidirectional encoder deep learning model in order to generate one or more predictive inferences and initiate the performance of the one or more prediction-based actions based at least in part on the one or more predictive inferences.

4. The computer-implemented method of claim 1 further comprising:
identifying one or more input structured data fields;
generating, based at least in part on the plurality of input tokenization sequences and an embedding model, one or more input embeddings for the one or more input structured data fields; and
generating, based at least in part on the one or more input embeddings and the bidirectional encoder deep learning model, one or more encoded representations for the one or more input structured data fields;
generating, based at least in part on the one or more encoded representations for an input structured data field of the one or more input structured data fields and a latent machine learning model, a predictive inference for the one or more input structured data fields; and initiating the performance of the one or more prediction-based actions based at least in part on the predictive inference.

5. The computer-implemented method of claim 4, wherein initiating the performance of the one or more prediction-based actions comprises enabling display of a predictive output user interface that describes the predictive inference.

6. The computer-implemented method of claim 1, wherein:
the plurality of training structured data fields is associated one or more indexed features, and
the plurality of per-field tokenized values for the plurality of training structured data fields comprises an indexed feature tokenized value for each indexed feature of the one or more indexed features.

7. The computer-implemented method of claim 1, wherein:
the at least one training structured data field comprises a claim data field of a plurality of claim data fields,
a field value for the claim data field is representative of a claim data field value for the claim data field,
a predictive entity for the claim data field is representative of a patient identifier value for the claim data field,
a data entry for the claim data field is representative of a claim identifier for the claim data field, and
a data entry segment for the claim data field is representative of a claim line identifier for the claim data field.

8. The computer-implemented method of claim 7, wherein:
the claim data field is associated with one or more patient attribute values, and
the plurality of per-field tokenized values comprises one or more patient attribute tokenized values that are generated based at least in part on the one or more patient attribute values.

9. The computer-implemented method of claim 7, wherein:
the claim data field is associated with one or more claim attribute values, and
the plurality of per-field tokenized values comprises one or more claim attribute tokenized values that are generated based at least in part on the one or more claim attribute values.

10. The computer-implemented method of claim 7, wherein:
the claim data field is associated with one or more provider attribute values, and
the plurality of per-field tokenized values comprises one or more provider attribute tokenized values that are generated based at least in part on the one or more provider attribute values.

11. A computing system comprising memory and one or more processors communicatively coupled to the memory, the one or more processors configured to:
identify a plurality of training structured data fields that comprises at least one training structured data field that is associated with a plurality of attributes that comprises (i) a field value, (ii) a field type, (iii) a predictive entity comprising an identifier representative of a common attribute among the plurality of training structured data fields, (iv) a data entry, and (v) a data entry segment within the data entry;
generate, based at least in part on a tokenization dictionary, a plurality of per-field tokenized values based at least in part on the plurality of attributes, wherein the plurality of per-field tokenized values comprises:

(a) a field value tokenized value that is generated based at least in part on the field value, (b) a field type tokenized value that is generated based at least in part on the field type, (c) a predictive entity tokenized value that is generated based at least in part on the predictive entity, (d) a data entry tokenized value that is generated based at least in part on the data entry, and (e) a data entry segment tokenized value that is generated based at least in part on the data entry segment;
generate a plurality of input tokenization sequences based at least in part on the plurality of per-field tokenized values, wherein the plurality of input tokenization sequences comprises a value tokenization sequence that is associated with the field value tokenized value, a field type tokenization sequence that is associated with the field type tokenized value, a predictive entity tokenization sequence that is associated with the predictive entity tokenized value, a data entry tokenization sequence that is associated with the data entry tokenized value, and a data entry tokenization segment sequence that is associated with the data entry segment tokenized value;
generate a bidirectional encoder deep learning model that is trained to learn a forward-direction ordering of the plurality of training structured data fields and a backward-direction ordering of the plurality of training structured data fields based at least in part on the plurality of input tokenization sequences; and
initiate the performance of one or more prediction-based actions based at least in part on one or more outputs generated by the bidirectional encoder deep learning model.

12. The computing system of claim 11, wherein the one or more processors are further configured to generate the bidirectional encoder deep learning model by:
generating a masked tokenized representation based at least in part on an unmasked subset of the plurality of per-field tokenized values that are associated with the at least one training structured data field;
generating the bidirectional encoder deep learning model based at least in part on the masked tokenized representation;
generating, based at least in part on one or more labeled structured data fields and the bidirectional encoder deep learning model, an output representation; and
using the output representation as input to a machine learning layer that is configured to generate an inferred label for each labeled structured data field of the one or more labeled structured data fields.

13. The computing system of claim 11, wherein the one or more processors are further configured to:
identify one or more input structured data fields;
generate, based at least in part on the plurality of input tokenization sequences and an embedding model, one or more input embeddings for the one or more input structured data fields; and
generate, based at least in part on the one or more input embeddings and the bidirectional encoder deep learning model, one or more encoded representations for the one or more input structured data fields
generating, based at least in part on the one or more encoded representations for an input structured data field of the one or more input structured data fields and a latent machine learning model, a predictive inference for the one or more input structured data fields; and initiating the performance of the one or more prediction-based actions based at least in part on the predictive inference.

14. The computing system of claim 11, wherein:
the plurality of training structured data fields is associated one or more indexed features, and
the plurality of per-field tokenized values for the plurality of training structured data fields comprises an indexed feature tokenized value for each indexed feature of the one or more indexed features.

15. The computing system of claim 11, wherein:
the at least one training structured data field comprises a claim data field of a plurality of claim data fields,
a field value for the claim data field is representative of a claim data field value for the claim data field,
a predictive entity for the claim data field is representative of a patient identifier value for the claim data field,
a data entry for the claim data field is representative of a claim identifier for the claim data field, and
a data entry segment for the claim data field is representative of a claim line identifier for the claim data field.

16. One or more non-transitory computer-readable storage media including instructions that, when executed by one or more processors, cause the one or more processors to:
identify a plurality of training structured data fields that comprises at least one training structured data field that is associated with a plurality of attributes that comprises (i) a field value, (ii) a field type, (iii) a predictive entity comprising an identifier representative of a common attribute among the plurality of training structured data fields, (iv) a data entry, and (v) a data entry segment within the data entry;
generate, based at least in part on a tokenization dictionary, a plurality of per-field tokenized values based at least in part on the plurality of attributes, wherein the plurality of per-field tokenized values comprises:
(a) a field value tokenized value that is generated based at least in part on the field value, (b) a field type tokenized value that is generated based at least in part on the field type, (c) a predictive entity tokenized value that is generated based at least in part on the predictive entity, (d) a data entry tokenized value that is generated based at least in part on the data entry, and (e) a data entry segment tokenized value that is generated based at least in part on the data entry segment;
generate a plurality of input tokenization sequences based at least in part on the plurality of per-field tokenized values, wherein the plurality of input tokenization sequences comprises a value tokenization sequence that is associated with the field value tokenized value, a field type tokenization sequence that is associated with the field type tokenized value, a predictive entity tokenization sequence that is associated with the predictive entity tokenized value, a data entry tokenization sequence that is associated with the data entry tokenized value, and a data entry tokenization segment sequence that is associated with the data entry segment tokenized value;
generate a bidirectional encoder deep learning model that is trained to learn a forward-direction ordering of the plurality of training structured data fields and a backward-direction ordering of the plurality of training structured data fields based at least in part on the plurality of input tokenization sequences; and
initiate the performance of one or more prediction-based actions based at least in part on one or more outputs generated by the bidirectional encoder deep learning model.

17. The one or more non-transitory computer-readable storage media of claim 16 further including instructions that, when executed by the one or more processors, cause the one or more processors to generate the bidirectional encoder deep learning model by:
generating a masked tokenized representation based at least in part on an unmasked subset of the plurality of per-field tokenized values that are associated with the at least one training structured data field;
generating the bidirectional encoder deep learning model based at least in part on the masked tokenized representation;
generating, based at least in part on one or more labeled structured data fields and the bidirectional encoder deep learning model, an output representation; and
using the output representation as input to a machine learning layer that is configured to generate an inferred label for each labeled structured data field of the one or more labeled structured data fields.

18. The one or more non-transitory computer-readable storage media of claim 16 further including instructions that, when executed by the one or more processors, cause the one or more processors to:
identify one or more input structured data fields;
generate, based at least in part on the plurality of input tokenization sequences and an embedding model, one or more input embeddings for the one or more input structured data fields; and
generate, based at least in part on the one or more input embeddings and the bidirectional encoder deep learning model, one or more encoded representations for the one or more input structured data fields
generating, based at least in part on the one or more encoded representations for an input structured data field of the one or more input structured data fields and a latent machine learning model, a predictive inference for the one or more input structured data fields; and
initiating the performance of the one or more prediction-based actions based at least in part on the predictive inference.

19. The one or more non-transitory computer-readable storage media of claim 16, wherein:
the plurality of training structured data fields is associated one or more indexed features, and
the plurality of per-field tokenized values for the plurality of training structured data fields comprises an indexed feature tokenized value for each indexed feature of the one or more indexed features.

20. The one or more non-transitory computer-readable storage media of claim 16, wherein:
the at least one training structured data field comprises a claim data field of a plurality of claim data fields,
a field value for the claim data field is representative of a claim data field value for the claim data field,
a predictive entity for the claim data field is representative of a patient identifier value for the claim data field,
a data entry for the claim data field is representative of a claim identifier for the claim data field, and
a data entry segment for the claim data field is representative of a claim line identifier for the claim data field.

* * * * *

UNITED STATES PATENT AND TRADEMARK OFFICE
CERTIFICATE OF CORRECTION

PATENT NO. : 12,131,229 B2
APPLICATION NO. : 16/915135
DATED : October 29, 2024
INVENTOR(S) : Louise O'Connor et al.

Page 1 of 1

It is certified that error appears in the above-identified patent and that said Letters Patent is hereby corrected as shown below:

In the Claims

In Column 26, Line 17, Claim 1, delete "learn" and insert -- learn a --, therefor.

Signed and Sealed this
Fourteenth Day of January, 2025

Derrick Brent
*Acting Director of the United States Patent and Trademark Office*